United States Patent [19]

Morawski et al.

[11] Patent Number: 4,602,797
[45] Date of Patent: Jul. 29, 1986

[54] TANDEM CHUCK

[76] Inventors: Longine V. Morawski; Lawrence V. Morawski, both of 15850 Common Rd., Roseville, Mich. 48066

[21] Appl. No.: 660,808

[22] Filed: Oct. 15, 1984

[51] Int. Cl.[4] .............................................. B23B 31/12
[52] U.S. Cl. .................................. 279/1 DC; 279/74; 279/110; 279/121
[58] Field of Search ............ 279/1 DC, 12, 1 R, 110, 279/121, 122, 123, 19, 19.4, 19.5, 89, 66, 1 F, 55, 57, 58, 60, 65, 74, 75, 119, 120

[56] References Cited

U.S. PATENT DOCUMENTS

| | | | |
|---|---|---|---|
| 1,180,355 | 4/1916 | White | 279/1 DC |
| 2,372,592 | 3/1945 | Lovely | 279/1 DC |
| 2,608,415 | 8/1952 | Drissner | 279/1 DC X |
| 2,984,493 | 5/1961 | Lindemann | 279/121 X |
| 3,010,728 | 11/1961 | Jennings | 279/110 X |
| 3,788,656 | 1/1974 | Smith | 279/19 X |
| 3,791,659 | 2/1974 | Hardin | 279/121 X |
| 3,834,720 | 9/1974 | Parsons | 279/110 X |
| 3,926,447 | 12/1975 | Cox, Jr. | 279/57 |
| 3,992,019 | 11/1976 | Crawshay | 279/74 X |
| 4,129,945 | 12/1978 | Eibefner | 279/1 DC X |
| 4,290,721 | 9/1981 | Knoll | 279/19 X |
| 4,482,162 | 11/1984 | Anegawa | 279/119 X |
| 4,504,070 | 3/1985 | Norton | 279/121 X |

FOREIGN PATENT DOCUMENTS

| | | | |
|---|---|---|---|
| 6806 | 1/1980 | European Pat. Off. | 279/1 DC |
| 22606 | 2/1983 | Japan | 279/1 R |

Primary Examiner—Gil Weidenfeld
Assistant Examiner—Glenn L. Webb
Attorney, Agent, or Firm—Barnes Kisselle Raisch Choate Whittemore & Hulbert

[57] ABSTRACT

A chuck for gripping long hollow workpieces has two independent sets of jaws actuated to the work-gripping and releasing positions by two independent puller plates. The puller plates are spring biased to shift the jaws to the work-gripping position. A single axially shiftable actuator has a lost motion connection with each puller plate to shift the jaws to the work-releasing position. The actuator also operates a safety latch which prevents accidental axial displacement of the workpiece on the chuck and a radial jack which provides radial support to a section of the workpiece subjected to a radial machining load.

7 Claims, 6 Drawing Figures

TANDEM CHUCK

This invention relates to a chuck and, more particularly, to a chuck for gripping relatively long workpieces which vary in diameter from one end to the other.

Some hollow workpieces which require machining on either the inside or the outside thereof are relatively long and vary in diameter from one end to the other. As a practical matter such workpieces cannot be gripped by a conventional chuck having a single set of jaws because it is difficult to design the jaws so that the workpiece will be supported in an accurately concentric position from one end to the other relative to the central axis of the chuck.

The object of the present invention is to provide a chuck having at least two independent sets of work-gripping jaws spaced apart axially on a chuck body and adapted to be operated to grip and release a workpiece by the stroke of a single actuator.

More specifically, the chuck of the present invention comprises a jaw body in which two sets of jaws are arranged in axially spaced relation. One jaw set is designed to grip the workpiece at one section thereof and the other set of jaws is designed to grip the workpiece at another section spaced axially and having a diameter different from the section gripped by the first set of jaws. Both sets of jaws are spring biased in one direction by individually adjustable springs and are displaceable in the opposite direction by a single actuator.

Other objects, features and advantages of the present invention will become apparent from the following description and accompanying drawings, in which.

Figure 1:
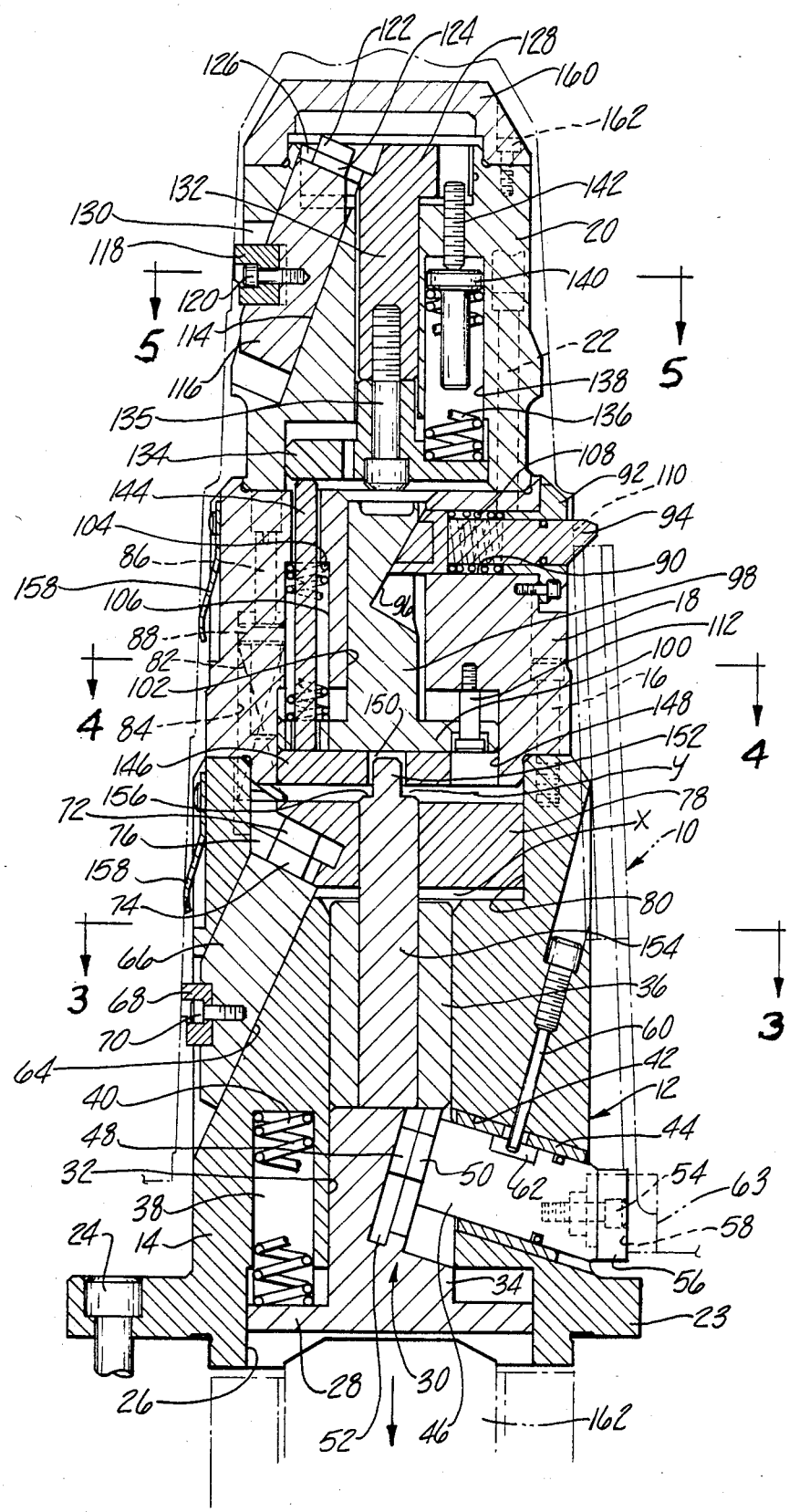
FIG. 1 is an axial sectional view of a chuck according to the present invention illustrated in the work-gripping position and showing some of the components out of position.
Figure 2:
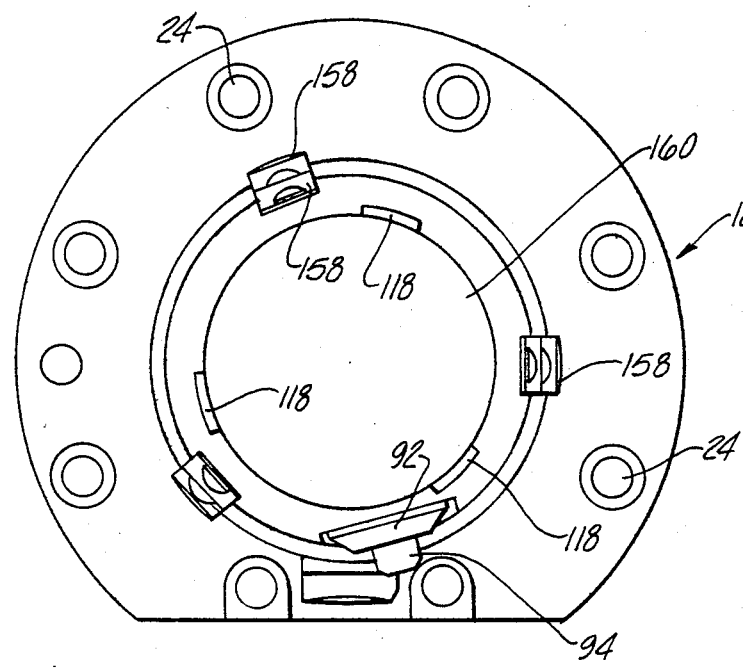
FIG. 2 is an end view of the chuck.
Figure 3:
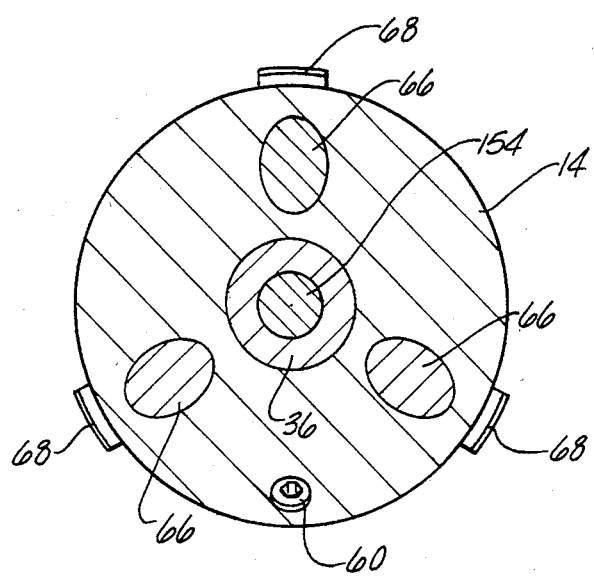
FIG. 3 is a view taken along the line 3—3 in FIG. 1.
Figure 4:
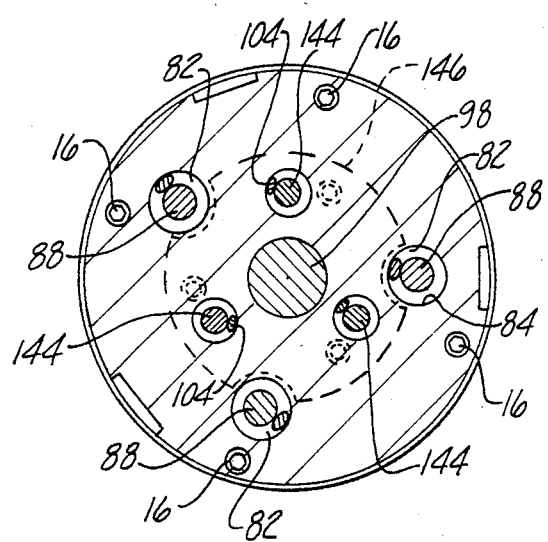
FIG. 4 is a view taken along the line 4—4 in FIG. 1.

Referring to FIG. 1, the chuck of the present invention is illustrated for gripping an upright workpiece 10, the inner peripheral surface of which is designated by broken lines. The chuck comprises a chuck body 12 which consists of a lower body section 14 to the upper end of which is rigidly connected by screws 16 a mid body section 18. An upper body section 20 is rigidly mounted on the upper end of the mid body section 18 by screws 22. The lower body section 14 has a flange 23 for mounting the chuck body on a pallet or a spindle by means of screws 24.

The lower body section 14 is formed at its lower end with a large counterbore 26 for slideably recieving the enlarged flanged end 28 of a lower slide 30. Bore 26 communicates with a smaller axial bore 32 in which the reduced shank 34 of slide 30 and a bushing 36 are arranged. Body section 12 is also formed with a plurality of blind bores 38 spaced circumferentially around bore 32 in which compression springs 40 are arranged. Springs 40 bear against flange 28 of slide 30 and bias the slide in a downward direction. At one side thereof body portion 14 is formed with a bore 42 inclined slightly radially in a downward and outward direction in which is received a bushing 44. Within bushing 44 there is slideably arranged a cylindrical jack 46. Jack 46 has an elongated tang 48 at its inner end connected with the body of jack 46 by a cylindrical neck 50. Tang 48 and neck 50 are adapted to slide in a T-shaped slot 52 in slide 30. Slot 52 is inclined slightly to the central axis of the chuck and is perpendicular to the central axis of cylindrical jack 46. At the outer end of jack 46 there is secured, as by a screw 54, a flat pad 56 which, when the chuck is in the gripping position, engages a flat surface 58 on the interior of the workpiece. It will be noted that in response to axial downward movement of slide 30 under the influence of springs 40 pad 56 is displaced radially outwardly and, when slide 30 is displaced upwardly, pad 56 is retracted radially. Jack 46 is prevented from rotating within bushing 44 by the end of a screw 60 which extends into an axial slot 62 in the jack. Jack 46 provides radial support when the outer face 63 of the workpiece is machined.

Figure 6:
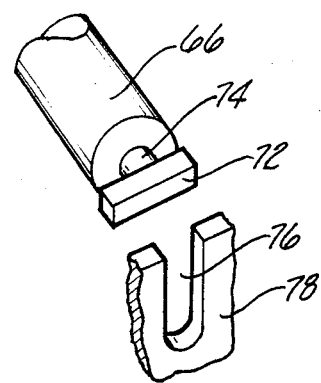
FIG. 6 is a fragmentary perspective view of one of the jaws and its associated puller plate.

The lower body section 14 is also formed with three circumferentially spaced bores 64 which incline radially outwardly in a downward direction. Within each bore there is arranged a cylindrical jaw 66. A jaw insert 68 is secured to the outer end of each jaw 66 by a screw 70. The inner end of each jaw 66 is formed with an elongated tang 72 connected with the body of the jaw by a reduced cylindrical neck 74 (FIG. 6). In the operative position tang 72 engages behind a U-shaped slot 76 in a puller plate 78 slideable within a bore 80 at the upper end of body section 14. Puller plate 78 is biased downwardly by three circumferentially spaced springs 82 retained in spring pockets 84 in the mid body section 18. The tension of springs 82 may be increased and decreased by means of adjusting screws 86 which bear against the enlarged end of a plunger 88 slideably arranged within the spring pockets 84. The upper ends of springs 82 bear against the enlarged end of plunger 88 and the lower ends of the springs bear against the top face of puller plate 78. When puller plate 78 is displaced downwardly under the bias of springs 82 jaws 66 are shifted axially downwardly and outwardly to cause the inserts 68 to engage the inner periphery of workpiece 10.

The mid body section 18 is formed with a radial bore 90 in which is secured a short bushing 92. A safety latch 94 is slideably arranged in bushing 92. The radially inner end of latch 94 engages a radially inclined surface 96 on an upper slide 98. The lower end of slide 98 is provided with an enlarged flange 100. Slide 98 is slideably arranged within a central bore 102 extending to the upper end of body section 18. Three circumferentially spaced springs 104 arranged in axially extending spring pockets 106 in body section 18 have their lower ends bearing against flange 100 of slide 98. Thus, slide 98 is normally biased downwardly and, in response to downward displacement of slide 98, latch 94, which is biased radially inwardly by a spring 108, is displaced radially outwardly so that its radially outer end engages the edge of an opening 110 in the workpiece so as to prevent the workpiece from being accidentally axially displaced on the chuck. Springs 104 are sufficiently strong to overcome the bias of spring 108. The extent of axial movement of upper slide 98 is limited by a shoulder screw 112.

Figure 5:
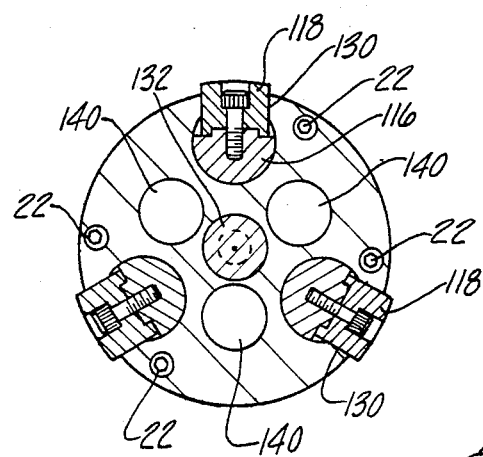
FIG. 5 is a view taken along the line 5—5 in FIG. 1.

The upper body section 20 is also formed with three circumferentially spaced and radially inclined bores 114 in which are slideably arranged jaws 116 which, like jaw 66, have inserts 118 secured thereto as by screws 120. Like jaws 66, jaws 116 have at the inner end thereof an elongated tang 122 connected with the body of the jaw by a reduced cylindrical neck portion 124. Each tang 122 engages behind a U-shaped slot 126 on an upper puller plate 128 in the same manner as illustrated in FIG. 6 with respect to the interengagement of jaws 66 with puller plate 78. Each of the six jaws is adapted to be interengaged with its respective puller plate by inserting the jaws through the radially outer ends of the bores 64,114 with the tangs 72,122 aligned with the U-shaped slots in the puller plates, such as illustrated at 76 in FIG. 6. After the tangs 72,122 have passed through the slots, the jaws are rotated 90° to interengage these tangs with the respective puller plates. Thereafter, the inserts 68,118 are secured to the respective jaws. When the inserts are secured to the jaws, the jaws are prevented from rotating within their respective bores by the interengagement of the side faces of the jaws with axially extending slots 130 in the respective jaw bodies as shown in FIG. 5.

Upper puller plate 128 is integrally connected with a central downwardly extending shaft 132 to the lower end of which is secured a spring plate 134 by a screw 135. Three compression springs 136 retained in spring pockets 138 in upper body section 20 have their lower ends bearing downwardly against spring plate 134. The uppper ends of springs 136 bear against the enlarged heads of plungers 140 slideably arranged in spring pockets 138. Plungers 140 are adapted to be shifted vertically in pockets 138 to vary the tension of springs 136 by adjusting screws 142. Thus, springs 136 normally urge puller plate 128 and spring plate 134 downwardly into engagement with spacer rods 144 which extend axially between the lower face of spring plate 134 and the upper face of a tonk plate 146 that is slideably arranged in the bore 148 in mid body section 18 in which the enlarged flange 100 of upper slide 98 is also arranged. Tonk plate 146 is centrally apertured as at 150 to accommodate the reduced end 152 of a push rod 154 slideably arranged in puller plate 78 and bushing 36. Push rod 154 has a length slightly less than the vertical distance between the upper end of lower slide 30 and the lower face of upper slide 98 when the chuck is in the work-gripping position. In this position the shoulder 156 adjacent the reduced end 152 of push rod 154 is spaced from the lower face of tonk plate 146 a distance slightly greater than the distance between the upper end of the reduced end 152 of push rod 154 and the lower face of slide 98. It will also be observed that when the chuck is in the work-gripping position shown in FIG. 1 the upper end of bushing 36 is spaced below the lower face of lower puller plate 78 as indicated at x. The distance x can be either greater or less than the distance y between the shoulder 156 and the lower face of tonk plate 146 depending upon the clamping sequence desired between the upper jaws 116 and lower jaws 66.

For initially centering the workpiece on the chuck there are provided two sets of centering springs 158, one set being mounted on the lower body section 14 and the other set on the mid body section 18. If desired, the upper end of body 12 can be closed by a cap 160 secured to the upper end of upper body section 20 by screws 162.

In the arrangement illustrated in the drawings the jaws are shifted radially outwardly to the work-gripping position shown in FIG. 1 under the bias of the two sets of springs 82,136. The workpiece is adapted to be released by axial displacement of an actuator 162. In the positions indicated in FIG. 1 of the several components of the chuck actuator 162 is in the retracted position. To release the workpiece actuator 162 is displaced upwardly to engage the lower slide 30 and shift it upwardly. As the lower slide 30 is displaced upwardly jack 46 is retracted radially inwardly so that the pad 56 moves out of engagement with the flat surface 58 on the workpiece. After actuator 162 has been shifted upwardly through a predetermined short distance, the upper end of the reduced portion 152 of push rod 154 engages the bottom surface of upper slide 98 and continued upward movement of the push rod initiates retraction of latch 94. At this particular moment shoulder 156 of push rod 154 has not yet engaged tonk plate 146 and the upper end of bushing 36 has not yet engaged the bottom face of puller plate 78. When the actuator 162 has been shifted upwardly a distance somewhat greater than the distances x and y, the two puller plates 78,128 have been displaced sufficient to retract jaws 66,116 out of engagement with the workpiece. Radial movement of jaw inserts 68,118 on the order of 0.020" will normally be sufficient to grip and release the workpiece.

It will be appreciated that when the components of the chuck are in the work-releasing position and actuator 162 is retracted vertically downwardly to the position shown in FIG. 1, the reverse sequence occurs. If the distance x is less than the distance y, the lower jaws 66 release the workpiece first and then the upper jaws. Thereafter, latch 94 is retracted and finally jack 46 is retracted to enable removal of the workpiece from the chuck.

We claim:

1. A chuck for gripping a relatively long workpiece at axially spaced sections thereof comprising: a chuck body having a central axis, a first set of work-gripping jaws spaced circumferentially around the axis of said body adjacent one end thereof, a second set of work-gripping jaws independent of the first set and spaced around the axis of the body adjacent the other end thereof, said jaws being radially displaceable to grip and release a workpiece at two axially spaced sections thereof, a first puller plate on said body operatively connected with said first set of jaws, a second puller plate on said body independent of the first puller plate and operatively connected with the second set of jaws, each of said puller plates being shiftable axially on said body in opposite directions for displacing the jaws radially in opposite directions to grip and release the workpiece, a first set of compression springs biasing the first puller plate in one direction, a second set of compression springs biasing the second puller plate in one direction and a single axially shiftable actuator operatively connected with each puller plate for shifting each puller plate in a direction opposite the spring bias thereon, the two puller plates being displaceable in the same direction for shifting the jaws to the work-gripping position, said sets of springs each having one end thereof acting against its respective puller plate and having their opposite ends axially fixed on said body, said puller plates being biased by said springs to shift the jaws to the work-gripping position, said actuator when shifted in one direction compressing said springs by displacing said one end thereof in one direction relative to said body and shifting each puller plate in the work-releasing direction, said actuator when shifted in the opposite direction allowing said one end of the springs to be displaced in the opposite direction until the jaws controlled by the respective set of springs are arrested by engagement with the workpiece.

2. A chuck as called for in claim 1 including means for varying the tension of each set of springs to thereby adjust the work-gripping pressure of each jaw.

3. A chuck as called for in claim 1 wherein said body comprises a plurality of axially successive sections removably connected together to form an axially rigid structure, one of said sections having a plurality of bores extending axially from one end thereof in which one set of said springs are disposed, another body section having a plurality of bores extending axially from one end thereof in which the other set of springs are disposed.

4. A chuck as called for in claim 3 including means accessible from the opposite end of each body section for varying the tension of each set of springs.

5. A chuck as called for in claim 1 including means forming a lost motion connection between the two puller plates such that, in response to displacement of the actuator in one direction, the first puller plate is shifted axially by the actuator before the second and, in response to displacement of the actuator in the opposite direction, the second puller plate is displaced in the opposite direction under the bias of the springs acting thereon before the first puller plate is shifted in the opposite direction under the bias of the springs acting thereon.

6. A chuck for gripping a relatively long workpiece at axially spaced sections thereof comprising: a chuck body having a central axis, a first set of work-gripping jaws spaced circumferentially around the axis of said body adjacent one end thereof, a second set of work-gripping jaws independent of the first set and spaced around the axis of the body adjacent the other end thereof, said jaws being radially displaceable to grip and release a workpiece at two axially spaced sections thereof, a first puller plate on said body operatively connected with said first set of jaws, a second puller plate on said body independent of the first puller plate and operatively connected with the second set of jaws, each of said puller plates being shiftable axially on said body in opposite directions for displacing the jaws radially in opposite directions to grip and release the workpiece, a first set of compression springs biasing the first puller plate in one direction, a second set of compression springs biasing the second puller plate in one direction and a single axially shiftable actuator operatively connected with each puller plate for shifting each puller plate in a direction opposite the spring bias thereon, said body having a radial bore therein extending to a peripheral surface of the body, a safety latch slideably arranged in said bore and shiftable radially between a position wherein one end of the latch projects radially beyond said surface to engage an axially facing shoulder on the workpiece and to a second position wherein said end of the latch is retracted from said projecting position to clear said shoulder and including means for shifting the latch to said projecting position in response to movement of the jaws to the work-gripping position and for retracting the latch in response to movement of the jaws to the work-releasing position.

7. A chuck as called for in claim 6 wherein said shifting means are arranged to shift the latch to its fully projected position after the jaws are shifted to the work-gripping position.

* * * * *